United States Patent
Nako et al.

(10) Patent No.: US 7,430,021 B2
(45) Date of Patent: Sep. 30, 2008

(54) VIDEO DISPLAY APPARATUS HAVING CONTOUR CORRECTION FUNCTION

(75) Inventors: Masahiro Nako, Yokohama (JP); Yasutaka Tsuru, Kamakura (JP); Ryo Hasegawa, Yokohama (JP); Katsunobu Kimura, Yokohama (JP); Hiroshi Aoki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 583 days.

(21) Appl. No.: 11/061,826

(22) Filed: Feb. 22, 2005

(65) Prior Publication Data

US 2005/0285977 A1 Dec. 29, 2005

(30) Foreign Application Priority Data

Jun. 24, 2004 (JP) .............................. 2004-185794

(51) Int. Cl.
*H04N 5/208* (2006.01)
(52) U.S. Cl. ..................................... 348/672
(58) Field of Classification Search ................. 348/625, 348/627, 628–631, 26, 672; 382/266 M, 382/268
See application file for complete search history.

(56) References Cited

U.S. PATENT DOCUMENTS

| 4,516,167 | A | | 5/1985 | Dion |
| 4,899,216 | A | * | 2/1990 | Tatsumi et al. ............... 358/521 |
| 5,227,869 | A | * | 7/1993 | Degawa ....................... 348/607 |
| 5,491,520 | A | * | 2/1996 | Nozawa et al. .............. 348/625 |
| 5,848,181 | A | | 12/1998 | Ogata |
| 5,852,648 | A | | 12/1998 | Miyamoto |
| 6,148,116 | A | | 11/2000 | Park et al. |
| 6,424,383 | B1 | * | 7/2002 | Terai et al. ................... 348/628 |
| 6,597,407 | B1 | * | 7/2003 | Taketani et al. ............. 348/625 |
| 7,002,636 | B2 | * | 2/2006 | Ishikawa et al. ............ 348/625 |
| 2002/0135702 | A1 | | 9/2002 | Yamaki |

FOREIGN PATENT DOCUMENTS

| EP | 0 809 209 | 11/1997 |
| JP | 07-154758 | 6/1995 |
| JP | 8-46926 | 2/1996 |
| JP | 9-44654 | 2/1997 |
| JP | 09-091419 | 4/1997 |
| JP | 9-114974 | 5/1997 |
| JP | 9-163144 | 6/1997 |
| JP | 9-307897 | 11/1997 |
| JP | 10-65935 | 3/1998 |
| JP | 10-164396 | 6/1998 |
| JP | 11-032201 | 2/1999 |

(Continued)

*Primary Examiner*—Paulos M Natnael
(74) *Attorney, Agent, or Firm*—Antonelli, Terry, Stout & Kraus, LLP.

(57) ABSTRACT

A picture quality correction circuit is provided which performs contour correction by grasping features of an input video signal accurately. The correction circuit has a filter circuit for extracting contour components in an inputted video signal, a contour component nonlinear processor for changing amplitudes of the contour components extracted by the filter circuit, an adder for adding outputs of the contour component nonlinear processor and the input video signal, a histogram detection circuit for detecting a histogram of the contour components extracted by the filter circuit, and a control circuit for controlling contour emphasis quantities for the contour component nonlinear processor in accordance with the results of detection by the histogram detection circuit.

12 Claims, 11 Drawing Sheets

FOREIGN PATENT DOCUMENTS

| | | |
|---|---|---|
| JP | 2001-13180 | 1/2001 |
| JP | 2001-078222 | 3/2001 |
| JP | 3326377 | 7/2002 |
| JP | 2002-290773 | 10/2002 |
| JP | 2004-7202 | 1/2004 |
| JP | 2004-7301 | 1/2004 |
| JP | 2004-128643 | 4/2004 |
| JP | 02004318615 A * | 11/2004 |
| WO | WO 94/11852 * | 5/1994 |

* cited by examiner

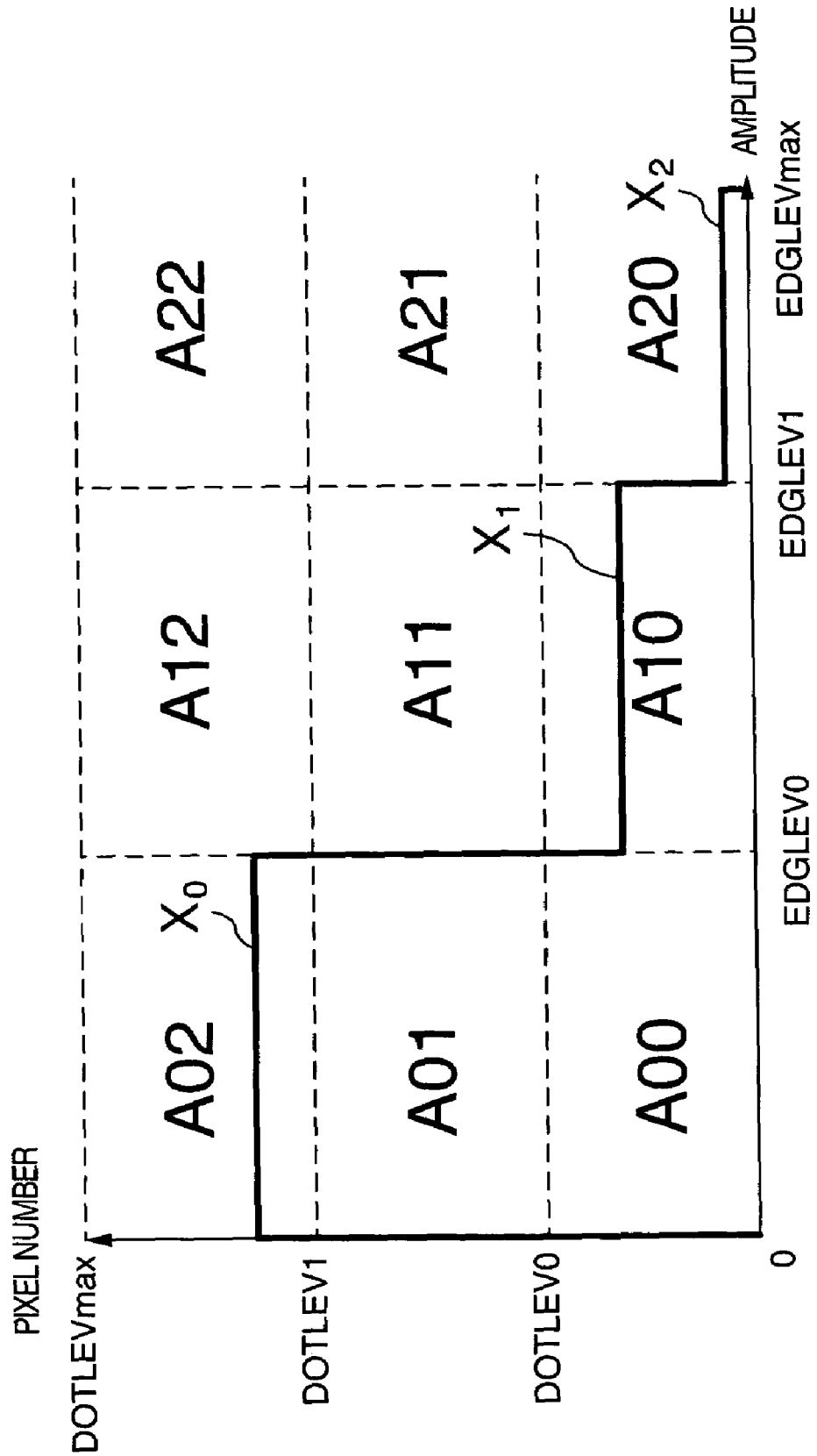

FIG.4A

| No. | | 1 | 2 | 3 | 4 | 5 | 6 | 7 | 8 | 9 | 10 | 11 |
|---|---|---|---|---|---|---|---|---|---|---|---|---|
| LESS THAN EDGLEV0 | A00 | O | O | O | O | O | O | | | | | |
| | A01 | | | | | | | O | O | O | O | |
| | A02 | | | | | | | | | | | O |
| BETWEEN EDGLEV0 AND EDGLEV1 | A10 | O | O | O | | | | | | | | |
| | A11 | | | | O | O | | | | | | |
| | A12 | | | | | | O | O | O | | | |
| BETWEEN EDGLEV1 AND EDGLEVmax | A20 | | O | O | O | O | O | O | O | O | O | O |
| | A21 | | | | | | | | | | | |
| | A22 | O | | | | | | | | | | |
| GAIN CONTROL | | SMALL | MEDIUM | SMALL | LARGE | MEDIUM | SMALL | SMALL | MEDIUM | SMALL | SMALL | SMALL |

FIG.4B

| OPERATION | CONTROL |
|---|---|
| SMALL | GAIN INCREASING QUANTITY: SMALL |
| | GAIN INCREASING QUANTITY: OFF OR NR |
| MEDIUM | GAIN INCREASING QUANTITY: MEDIUM |
| LARGE | GAIN INCREASE QUANTITY: LARGE |

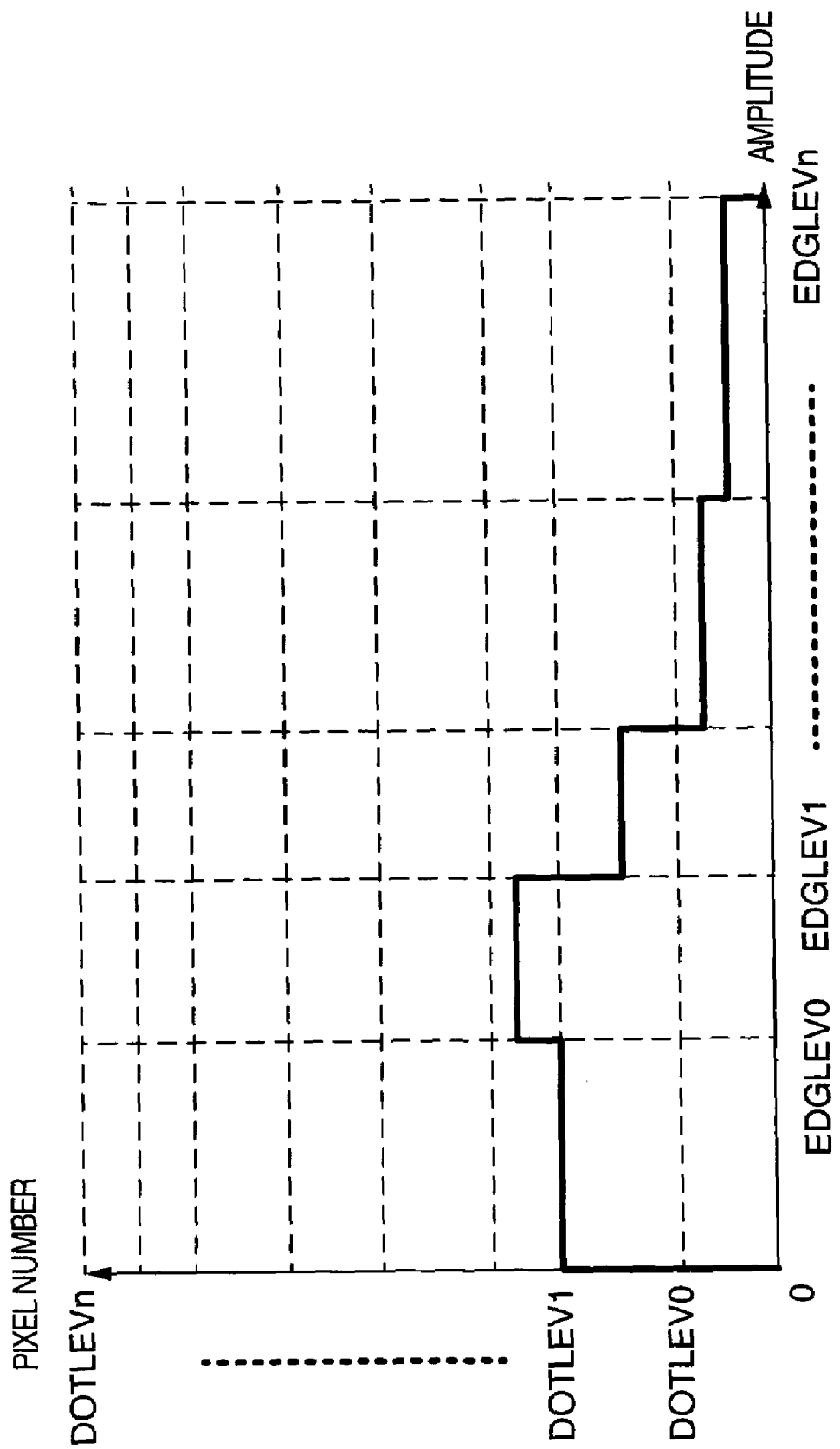

VIDEO DISPLAY APPARATUS HAVING CONTOUR CORRECTION FUNCTION

INCORPORATION BY REFERENCE

The present application claims priority from Japanese application JP 2004-185794 filed on Jun. 24, 2004, the content of which is incorporated by reference into this application.

BACKGROUND OF THE INVENTION

1. Field of the Invention

The present invention relates to a video display apparatus having the contour correcting function.

2. Description of the Related Art

Contour correction as described in, for example, Japanese Patent No. 3326377 (hereinafter referred to as Patent Document 1) has hitherto been known. Patent Document 1 discloses that levels of contour components are made to be constant on the basis of a peak level of a high frequency component (contour component) extracted from a video signal and the gain for high frequency components is controlled on the basis of values of contour components cumulated over a predetermined period.

SUMMARY OF THE INVENTION

Various kinds of pictures are displayed on the video display apparatus. For example, in a picture consisting of a white background and a single object of relatively dark color, contour components (each expressed by a first order or second order differential of a video signal) occupy the screen at a small ratio but the individual contour components have high levels. On the other hand, in a picture consisting of a plurality of objects mutually having small brilliance difference and color difference, contour components occupy the screen at a large ratio but the individual contour components have low levels.

In the technique described in Patent Document 1 as above, contour components are cumulated over the predetermined period and therefore there is a possibility that the same cumulative value is calculated for the two kinds of pictures as above and the same contour correction is applied to the two different pictures. Namely, the technique described in Patent Document 1 raises a possibility that proper contour correction conforming to conditions of contour components in a picture (contour component levels and the number of contour components in the overall screen) cannot be achieved. This invention provides a video display apparatus capable of making proper contour correction in accordance with the condition of a picture.

The video display apparatus according to the present invention makes contour correction by controlling levels of contour components contained in an input video signal on the basis of frequencies of occurrence of contour components ranked in individual predetermined plural level ranges.

More particularly, in the present invention, a histogram of frequencies of occurrence of contour components extracted from an input video signal is detected over a predetermined period (for example, one field or one frame period of the input video signal) and the quantity of contour correction is controlled using the histogram. This histogram is effective to grasp the number of pixels associated with contour components ranked in each of the predetermined level ranges in one screen (during one field or one frame period). Through the use of the histogram of contour components, conditions of the contour components in a picture on one screen can be grasped accurately and therefore proper contour correction conforming to conditions of the contour components in the picture can be made.

A signal correction circuit for this purpose comprises a filter circuit for extracting contour components from an input video signal, a level change circuit for changing levels of the extracted contour components, an adder for adding outputs from the level change circuit and the input video signal, a detection circuit for detecting a histogram of the extracted contour components over a predetermined period (integral values over the predetermined period of the number of pixels associated with contour components contained in individual predetermined level ranges) and a control circuit for controlling the level change circuit in accordance with the results of detection by the detection circuit. The control circuit may be of the type for controllably changing the pass band of the filter circuit.

Further, a first filter circuit for contour correction and a second filter circuit for histogram detection may be provided and pass bands of the respective filters may be different from each other. In this case, the pass band of the second filter may be broader than that of the first filter.

According to this invention, a high-quality picture applied with contour correction conforming to the picture can be displayed.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram showing an example of an amplitude-pixel map used for contour correction according to the invention.

FIGS. 4A and 4B are diagrams showing an example of a control table for contour correction according to the invention.

FIG. 5 is a diagram showing another example of the amplitude-pixel map used in the contour correction according to the invention.

DETAILED DESCRIPTION OF THE EMBODIMENTS

Embodiments of the present invention will now be described by making reference to the accompanying drawings. It is presupposed that a video signal inputted to a signal correction circuit to be detailed hereinafter is a digital video signal.

Figure 10:
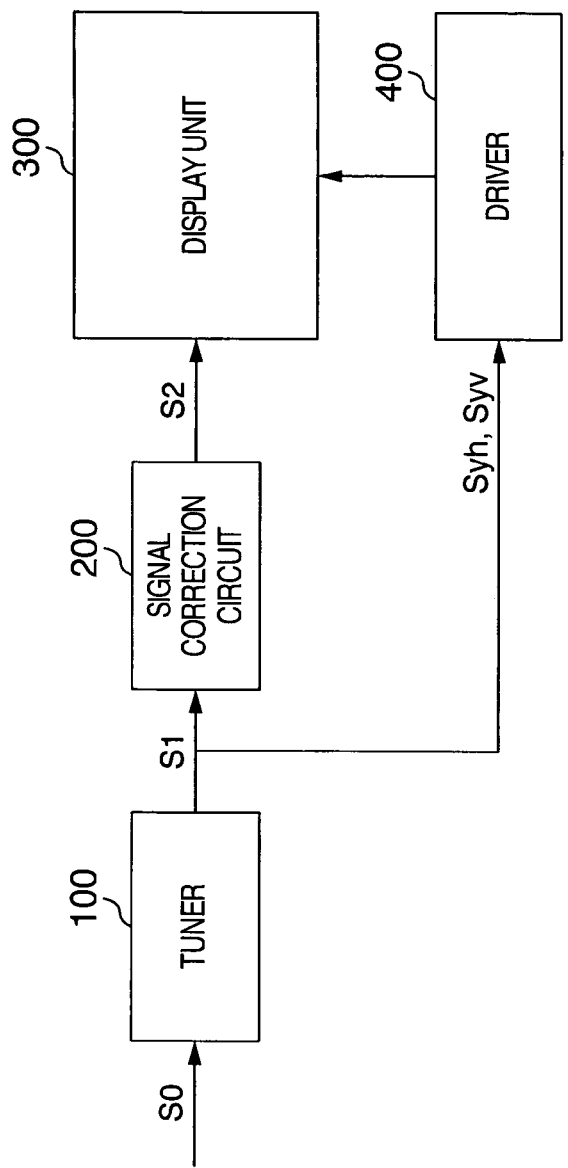
FIG. 10 is a schematic block diagram of a video display apparatus to which the invention is applied.

Referring first to FIG. 10, an example of a video display apparatus to which the invention is applied will be outlined. A tuner 100 receives a television signal S0 of a desired channel through the medium of an antenna or the like. Television signals may be of the analog type or digital type but the television signal to be received herein is of the coded digital type. In case a television signal of the analog type is received, the signal is converted into a digital video signal. The tuner 100 includes a demodulator and a decoder, not shown. The received digital television signal is demodulated by means of the demodulator and then decoded by means of the decoder so that a video signal S1 of the digital type as well as horizontal and vertical synchronizing pulses Syh and Syv of the digital type may be delivered. A driver 400 follows timings determined by the horizontal and vertical synchronizing pulses Syh and Syv delivered out of the tuner 100 to drive a display unit 300 by scanning it pursuant to a predetermined scheme (interlaced scanning or sequential scanning). In this example, the display unit 300 is constructed of a flat panel display such as plasma display panel, liquid crystal display panel or field emission display panel.

On the other hand, the digital video signal S1 is supplied to a signal correction circuit 200 so as to be applied with various kinds of signal correction processing. Specifically, the signal correction circuit 200 applies to the digital video signal S1 the contour correction according to the invention and as necessary, color correction, contrast correction or γ correction and eventually delivers a video signal S2 to the display unit 300. The display unit 300 follows scanning by the driver 200 to display a picture on the basis of the corrected video signal S2.

(1) Embodiment 1

Figure 1:
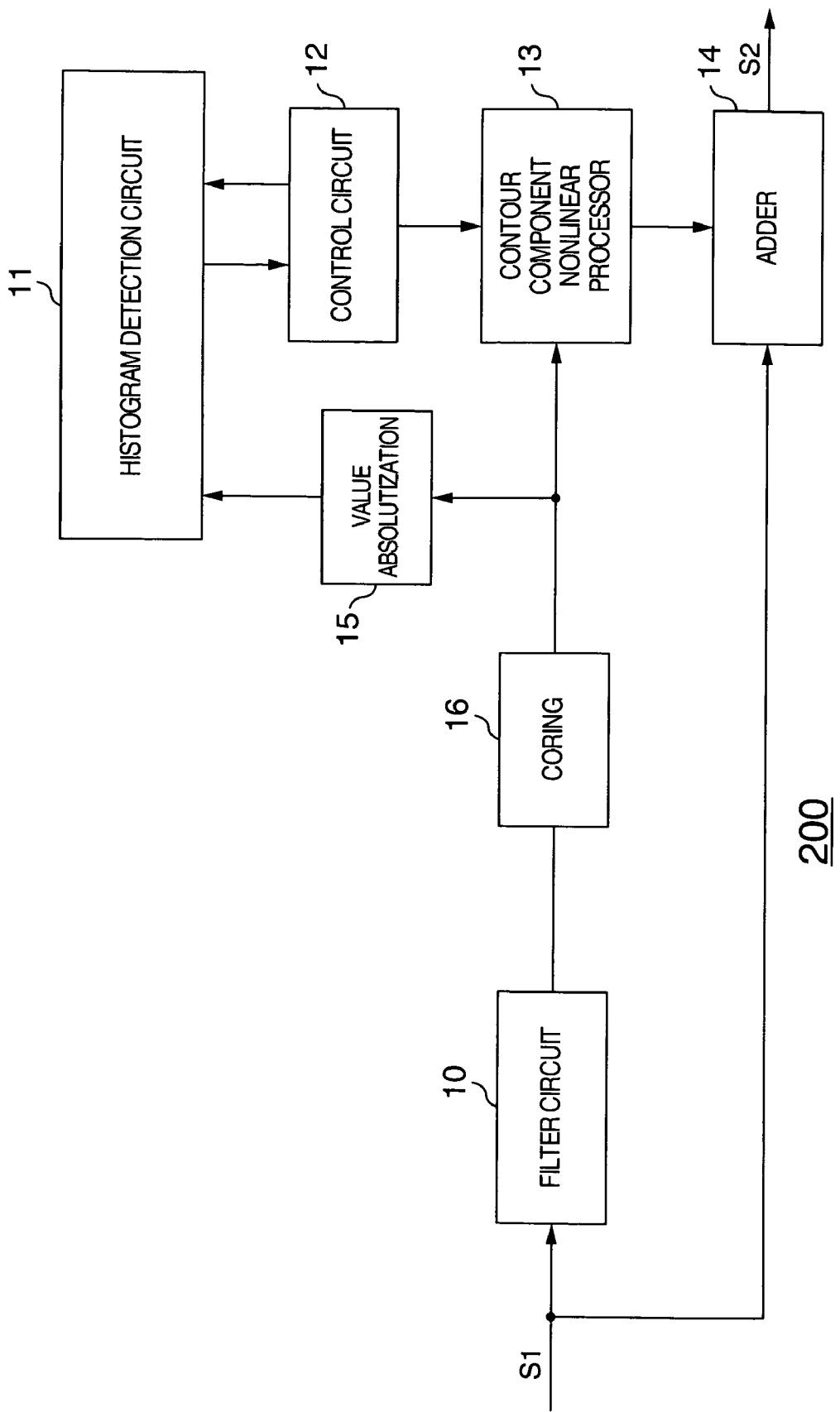
FIG. 1 is a block diagram of a signal correction circuit according to a first embodiment of the present invention.

Next, a first embodiment of the signal correction circuit 200 according to this invention will be described with reference to FIG. 1. Illustrated in FIG. 1 is only a portion relating to contour correction which is one of various kinds of signal correction operations executed by the signal correction circuit 200.

The aforementioned digital video signal S1 is inputted to a filter circuit 10 which extracts from the digital video signal S1 predetermined frequency components, that is, contour components of high frequency components. For example, the filter circuit 10 is constructed of a BPF (band-pass filter) or HPF (high-pass filter) having a changeable tap coefficient and causes the digital video signal S1 to be subjected to first order or second order differential by changing the tap coefficient. In the present embodiment, the digital video signal S1 is second-order differentiated so that contour components of the video signal may be extracted (in other words, second order differential values of the video signal are defined as contour components). The contour components extracted by the filter circuit 10 are subjected to a coring process by means of a coring circuit 16 in order that noise components can be suppressed or removed. A signal from the coring circuit 16 is delivered to a contour component nonlinear processor 13 representing a level change circuit for changing levels of the contour components and to a value absolutizing circuit 15. The contour component nonlinear processor amplifies the contour components in accordance with given contour emphasis quantities and delivers the amplified contour components to an adder 14. The adder 14 is fed with the original digital video signal S1 and the contour components amplified by the contour component nonlinear processor 13 to add them together so as to deliver a video signal S2 applied with contour correction (contour emphasis). The thus contour-corrected video signal S2 is supplied to the display unit 300 in FIG. 10 as described previously.

On the other hand, the value absolutizing circuit 15 absolutizes values of the contour components applied with the coring process by means of the coring circuit 16 and delivers resulting absolute values to a histogram detection circuit 11. The histogram detection circuit 11 uses the contour components absolutized by the value absolutizing circuit 15 to determine frequencies by which the contour components occur in accordance with their levels, that is, a histogram. In the present embodiment, the histogram detection circuit 11 calculates frequencies of occurrence of contour components ranked in individual predetermined plural level ranges, that is, the number of pixels associated with the contour components ranked in each of the predetermined level ranges during one video signal screen (for example, video signal for one field or one frame. Hereinafter simply referred to as "one screen"), thereby obtaining the aforementioned histogram. The histogram of contour components detected by the histogram detection circuit 11 is supplied to a control circuit 12. The control circuit 12 determines a contour emphasis quantity for the aforementioned contour component nonlinear processor 13 on the basis of the detected histogram of contour components and controls the amplification factor (gain) of the contour component nonlinear processor 13. With the construction as above, the digital video signal S1 can be applied with contour correction (contour emphasis) in accordance with the histogram of the contour components contained in the digital video signal S1.

Figure 2A:
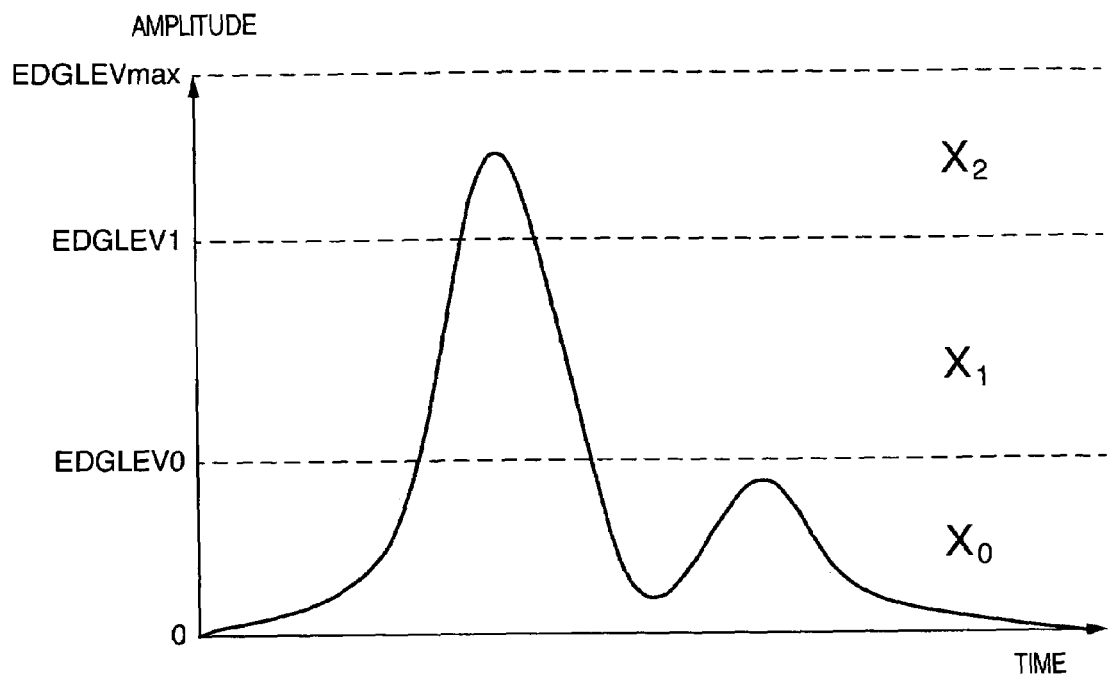
FIGS. 2A and 2B are graphical representations showing an example of the results of detection by a histogram circuit in the signal correction circuit according to the invention.
Figure 2B:
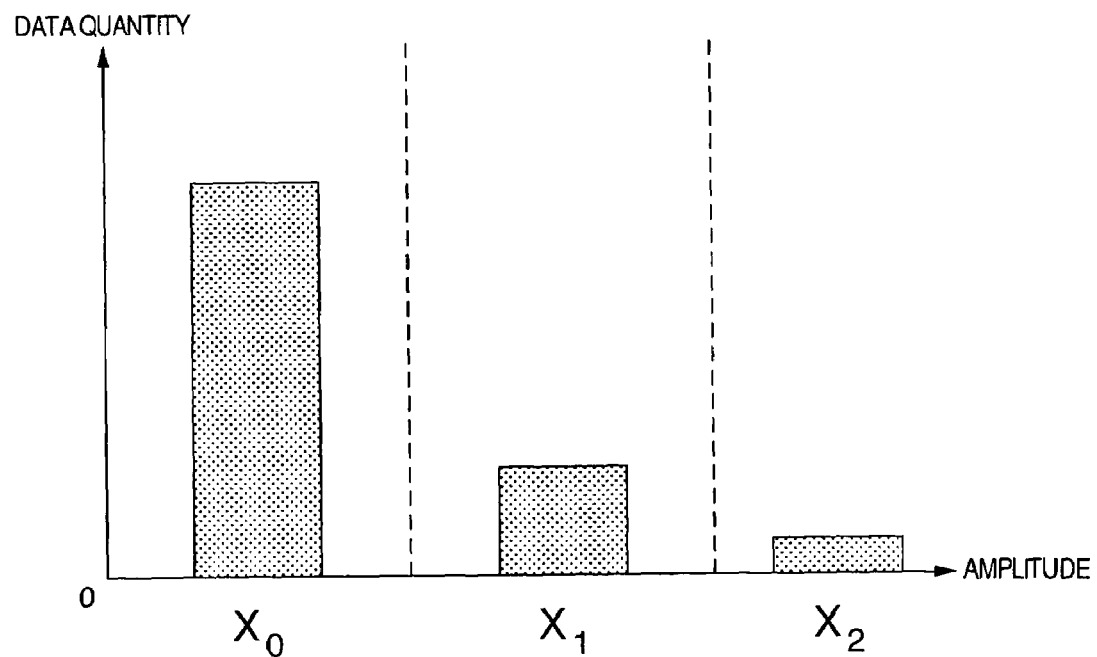

Operation of detecting the histogram of contour components carried out by the histogram detection circuit 11 will be described hereunder in greater detail with reference to FIGS. 2A and 2B. An example of value-absolutized contour components for one horizontal line is illustrated in FIG. 2A. It is presupposed that as shown in FIG. 2A, the contour components whose values are absolutized by the value absolutizing circuit 15 are ranked in any of a plurality of level ranges ($X_0$, $X_1$, $X_2$) partitioned by a plurality of preset boundaries (EDGLEV$_0$, EDGLEV$_1$, EDGLEV$_{max}$). In the present embodiment, there are provided three boundaries EDGLEV$_0$, EDGLEV$_1$ and EDGLEV$_{max}$ and three pattitive level ranges ($X_0$, $X_1$, $X_2$). Needless to say, the partitive level ranges can be increased in number, preferably up to 8 but for simplicity of explanation, the number is set to 3 in this example. The histogram detection circuit 11 decides which one of the partitive level ranges ($X_0$, $X_1$, $X_2$) each contour component belongs to by comparing each contour component with each of the boundaries (EDGLEV$_0$, EDGLEV$_1$, EDGLEV$_{max}$) in respect of pixels associated with each contour component. The histogram detection circuit 11 includes a plurality of counters, not shown, allotted in correspondence to the individual partitive level ranges. Then the histogram detection circuit 11 counts, in respect of the individual partitive level ranges, the number of pixels associated with individual contour components ranked to each partitive level range through the use of each of the plurality of counters. Counting the number of pixels in each partitive level range proceeds over one field or one frame period of a video signal, with the result that pixels ranked in the individual partitive level ranges are cumulated in number for one screen. In this manner, frequencies of occurrence of the contour components ranked in the individual partitive level ranges ($X_0, X_1, X_2$) over one screen, that is, a histogram of the contour components can be detected as shown in FIG. 2B. Here, where the total number of pixels over one screen is X, $X=X_0+X_1+X_2$ stands.

Next, control operation by the contour component nonlinear processor 13 provided in the control circuit 12 will be described specifically with reference to FIG. 3 and FIGS. 4A and 4B. In the control circuit 12, the results of detection by the histogram detection circuit 11 are mapped on an amplitude-pixel map as shown in FIG. 3. More specifically, a two-dimensional space having its abscissa representing the amplitude (level) of contour component and its ordinate representing the number of pixels is divided by predetermined three amplitude boundaries ($EDGLEV_0$, $EDGLEV_1$, $EDGLEV_{max}$) and three pixel number boundaries ($DOTLEV_0$, $DOTLEV_1$, $DOTLEV_{max}$) to set an amplitude-pixel map including nine data areas (A00 to A02, A10 to A12, A20 to A22). The level ranges $X_0$, $X_1$ and $X_2$ shown in FIG. 2B correspond to ranges of 0 to $EDGLEV_0$, $EDGLEV_0$ to $EDGLEV_1$ and $EGGLEV_1$ to $EDGLEV_{max}$, respectively. Then it is decided which one of the data areas (A00 to A22) the number of pixels in each partitive level range ($X_0, X_1, X_{max}$) corresponds to, the pixel number representing the results of detection of a histogram of the contour components, and mapping as shown in FIG. 3 is carried out. Here, the pixel number (the number of pixels) in the level range $X_0$ corresponds to the data area A02, the pixel number in the level range $X_1$ corresponds to the data area A10 and the pixel number in the level range $X_2$ corresponds to the data area A20.

The control circuit 12 consults a control table as shown in FIG. 4A by using the amplitude-pixel map obtained as above to calculate control quantities of the gain for the contour component nonlinear processor 13. This control table is stored internally of the control circuit 12 or in a memory (not shown) connected to the control circuit 12. It will be appreciated that the control table stores the correspondence showing how combinations of data areas, each area corresponding to the number of pixels in each partitive level range ($X_0, X_1, X_2$) and being hereinafter referred to as corresponding data area, are related to the gain control quantities for the contour component nonlinear processor 13. For example, where the total number of pixels is 100, the number of pixels at the pixel number boundary $DOTLEV_0$ is 30, the number of pixels at the pixel number boundary $DOTLEV_0$ is 60 and the number of pixels at the pixel number boundary $DOTLEV_{max}$ is 100 (=total pixel number X), the number of data combinations of the correspondence relations is 11 in total. Thus, in the present embodiment, optimum control quantities are set in advance in correspondence to the individual eleven combination patterns as shown in FIG. 4A. The control quantities corresponding to the combination patterns can be set at discretion.

Then, the control circuit 12 determines a combination of corresponding data areas from the amplitude-pixel map shown in FIG. 3 and reads a control quantity corresponding to the combination from the control table to control the gain for the contour component nonlinear processor 13. In the case of FIG. 3, the control circuit 12 determines that a combination of corresponding data areas is {A02, A10, A20}. This combination pattern corresponds to No. 11 in FIG. 4A. Accordingly, the control circuit reads from the control table shown in FIG. 4A a control quantity corresponding to No. 11, that is, "small" and controls the contour component nonlinear processor 13 such that the gain increasing quantity is decreased or the gain increasing quantity is turned off as shown in FIG. 4B. Further, with the control quantity being "small", a control operation for operating a noise reduction (NR) circuit may be done as shown in FIG. 4B. If, as also shown in FIG. 4B, a control quantity "medium" is selected from the control table, the gain increasing quantity is set to medium and if a control quantity "large" is selected from the control table, the gain increasing quantity is increased.

How to make the correspondence of a combination of corresponding data areas with a control quantity will now be described by taking a typical pattern, for instance. When the combination pattern corresponds to No. 11 as in the case of FIG. 3, components in the low level range $X_0$ are the most and conceivably a great deal of contour components of small amplitude, that is, noise components are contained. Therefore, the control quantity for gain is made to be "small" in this case to keep the noise components from being amplified. When the combination pattern corresponds to No. 4, components in the medium level range $X_1$ are more than in other ranges but conceivably their amplitudes are not so large. Accordingly, the contours are considered blurred in this case and the control quantity for gain is made to be large, thereby making the contours distinct. Further, when the combination pattern corresponds to No. 1, components in the high level range $X_2$ are the most, having large amplitudes. In this case, the contours have already been distinct and therefore the control quantity for gain is set to "small" so as to prevent the glitter due to an excessive contour emphasis.

The description of the correspondence between the combination of corresponding data areas and the control quantity given as above is to show an example only and the correspondence can be changed as desired by respecting contours supposed to reside in each pattern or noise conditions. In addition, 3 ranks of large, medium and small levels of the preset control quantity are assumed but obviously the number of ranks can be increased.

Figure 11:
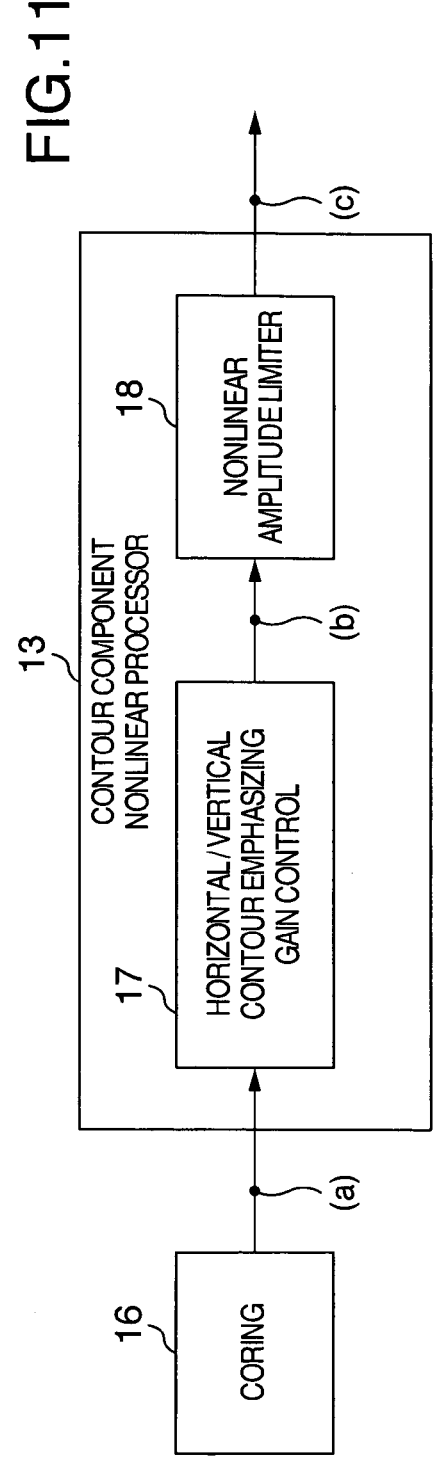
FIG. 11 is a schematic block diagram of a contour component nonlinear processor according to an embodiment of the invention.
Figure 12B:
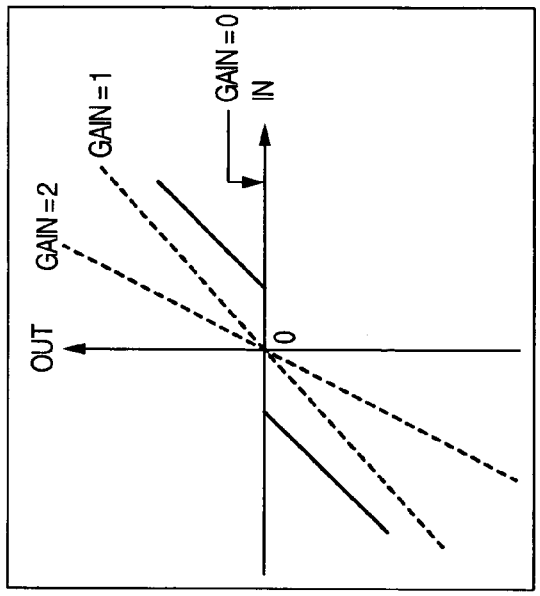
FIGS. 12A, 12B and 12C are diagrams showing examples of output characteristics at essential points in the contour component nonlinear processor according to the invention, respectively.
Figure 12A:
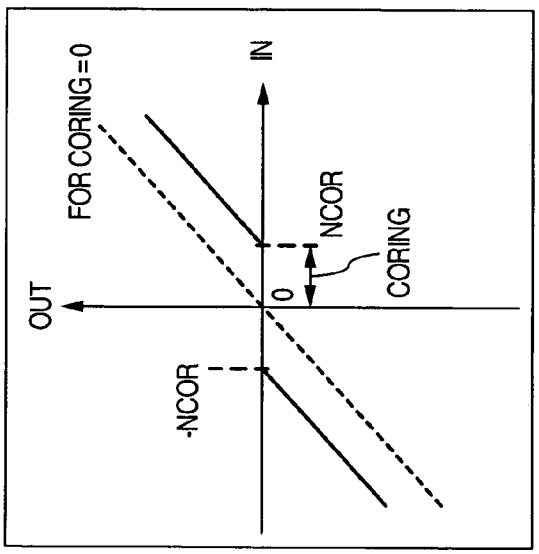
Figure 12C:
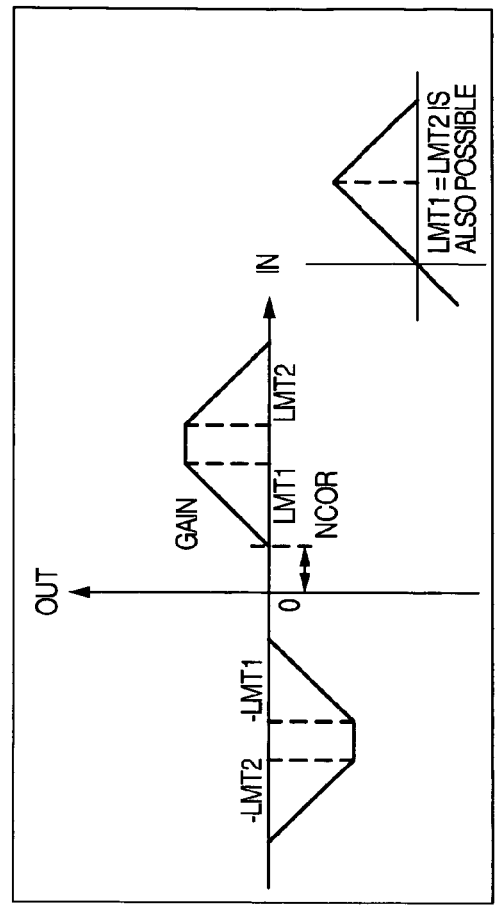

Next, details of the contour component nonlinear processor 13 will be described with reference to FIG. 11 and FIGS. 12A to 12C. As shown in FIG. 11, the contour component nonlinear processor 13 includes a horizontal/vertical contour emphasizing gain controller 17 and a nonlinear amplitude limiter 18. Input/output characteristics at points (a), (b) and (c) in FIG. 11 are depicted in FIGS. 12A, 12B and 12C, respectively. Firstly, the coring circuit 16 is provided with a dead band (between NCOR and −NCOR) as shown in FIG. 12A and the level of output signals corresponding to input signals which is between NCOR and −NCOR is zeroed. Thus, noise components having small levels between NCOR and −NCOR can be eliminated. A signal removed of noises by means of the coring circuit 16 is inputted to the horizontal/vertical contour emphasizing gain controller 17 inside the contour component nonlinear processor 13. The gain controller 17 is supplied with gain control quantities complying with a detected histogram from the control circuit 12 and controls the gain for the signals from the coring circuit 16 as shown in FIG. 12B. In FIG. 12B, GAIN=1 corresponds to an input/output characteristic of the gain controller 17 when, for example, the gain control quantity "medium" is selected from the control table shown in FIG. 4A and OUT=IN is held according to this characteristic. Further, GAIN=2 corresponds to an input/output characteristic of the gain controller 17 when, for example, the gain control quantity "large" is selected from the control table and OUT=2×IN is held according to this characteristic. As shown in FIG. 12B, any of the characteristics are linear but for GAIN=2 (gain control quantity "large"), the gradient of the input/output characteristic is made to be larger than that for GAIN=1 (gain control quantity "medium"), so that the amplitudes of contour components can be amplified more intensively. Further, GAIN=0 corresponds to an input/output characteristic of the gain controller 17 when, for example, the gain quantity "small" is selected from the control table. In this case, the level of an output signal corresponding to an input signal of any level becomes 0 (zero). In other words, the level of contour components is 0 and no contour emphasis is done. In this example, for the gain control quantity "small", GAIN=0 is held to prevent the contour emphasis from being effected but the contour can be emphasized slightly by providing a gain smaller than GAIN=1 and larger than GAIN=0, for example, GAIN=0.5. The values of GAIN=0, 1, 2 given as above are a mere example and these values can be changed as desired.

The signal for which the gain is to be controlled by the gain controller 17 is inputted to the nonlinear amplitude limiter 18. The limiter 18 is effective when the enhancer gain is intensified with a view of emphasizing a contour signal of small amplitude. Details of the limiter 18 will now be described by way of example of an input signal of 8-bit digital signal having its maximum value of 255. The limiter 18 has, for example, an upwardly convex input/output characteristic and a downwardly convex input/output characteristic in positive and negative regions, respectively, as shown in FIG. 12C. Only the input/output characteristic in the positive region will be described hereunder. This is because the input/output characteristic in the negative region is symmetrical to that in the positive region and will not be described. For example, the limiter 18 has two limiters having mutually different values (LMT1=150, LMT2=200) and a range of NCOR to LMT1 has a gradient of 1, a range of LMT1 to LMT2 has a gradient of 0 and a range of LMT2 and the ensuing has a gradient of –1. Accordingly, the output signal level increases in proportion to the input signal level when an input signal IN is NCROR<IN<LMT1 and the output signal level is constant when the input signal IN is between LMT1 and LMT2, that is, 150≦IN≦200. Then, when the input signal IN is larger than LMT2, that is, LMT2<IN, the output signal level decreases in proportion to increase of the input signal level. With this construction, a contour signal having a large amplitude in excess of a constant level is so controlled that its amplitude level can be constant or decreased and as a result, the contour signal of large amplitude can be prevented from being emphasized excessively. Accordingly, the picture quality can be protected from being deteriorated at a contour having the large amplitude. In an alternative, LMT1=LMT2 may be held and control of the number and gradient of LMT's can be set at discretion by means of the control circuit 12.

As described above, according to the present embodiment, frequencies of occurrence of contour components ranked in individual partitive level ranges, that is, a histogram of the contour components is detected and levels of the contour components are controlled in accordance with a combination of corresponding data areas associated with the individual partitive level ranges. Accordingly, a picture consisting of, for example, a white background and a single object of relatively dark color exemplified in connection with the conventional problems can be discriminated in the contour condition from a picture consisting of a plurality of objects mutually having less brightness difference and color difference and hence, contour corrections suitable for the respective pictures can be executed.

Further, since in the present embodiment the contours are corrected by detecting a histogram of contour components during a predetermined period, for example, one field or one frame period of a video signal, errors in contour correction in the contour component nonlinear processor 13 can be minimized as far as possible. Namely, in the present embodiment, the condition of a picture (conditions of contours contained in the picture) can be decided accurately and control for more natural contour emphasis can be executed. It is to be noted that the contour components subject to amplitude correction can be selected suitably by changing the pass band of the filter circuit 10. Accordingly, either contour components of relatively low frequency or contour components of relatively high frequency can be selected as desired in compliance with requests and can be corrected properly.

Furthermore, in the present embodiment, the number of amplitude boundaries is 3 and the number of pixel number boundaries is also 3 and 9 data areas are set in connection with the control circuit 12 but this is for simplicity of explanation only and obviously the number is not limited thereto. To comply with requested accuracies of contour correction, the number of amplitude boundaries, the number of pixel number boundaries and the number of data areas can be set as desired. Illustrated in FIG. 5 is another example of an amplitude-pixel map in which the number of amplitude boundaries, the number of pixel number boundaries and the number of data areas are increased as compared to those in FIG. 3. By using this map, the contour correction can be made more finely and more smoothly. Accordingly, with the map shown in FIG. 5, more natural screen displays than those obtained with the map of FIG. 3 can be realized.

(2) Embodiment 2

Figure 6:
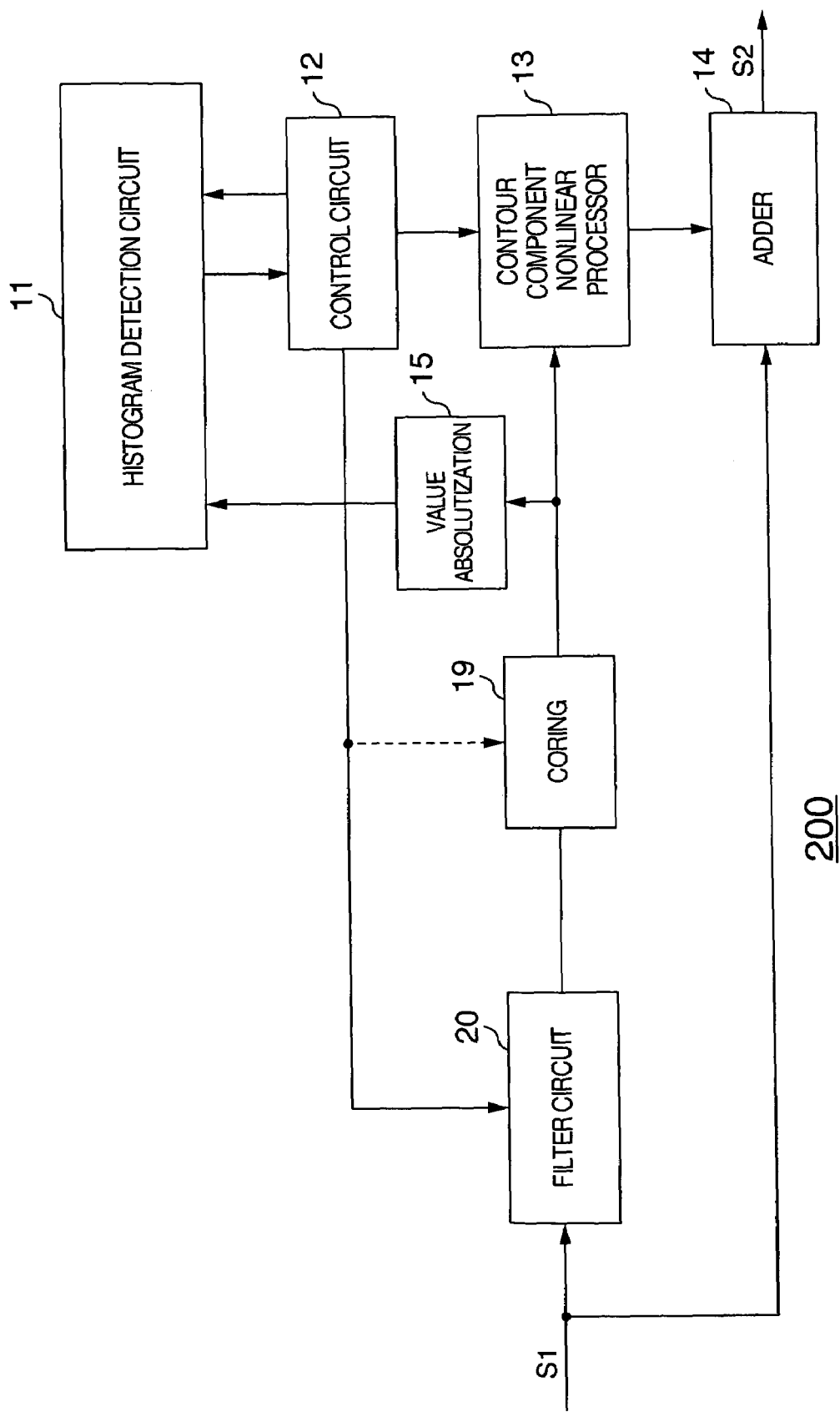
FIG. 6 is a block diagram of a signal correction circuit according to a second embodiment of the invention.

Referring now to FIG. 6, a second embodiment of the invention will be described. The second embodiment differs from the first embodiment shown in FIG. 1 in that a filter circuit 20 and a coring circuit 19 can be controlled by means of the control circuit 12. Components functioning identically to those in FIG. 1 are designated by the same reference numerals and will not be described.

In FIG. 6, the filter circuit 20 is a band-pass filter (BPF) for extracting contour emphasis components from an input video signal and its pass band can be changed by a control signal from the control circuit 12. Like the first embodiment, the control circuit 12 responds to the results from the histogram detection circuit 11 to control contour emphasis quantities for the contour component nonlinear processor 13 and to control the filter coefficient of the filter circuit 20 so that its pass band can be controlled.

In the present embodiment, by making the pass band of the filter circuit 20 controllable, a pass band optimum for the histogram detection and contour correction can be selected in accordance with the kind of an input video signal. For example, the frequency band of a video signal differs for a NTSC (National Television Standards Committee) signal of ground wave analog broadcasting and a high-vision signal of ground wave and satellite digital broadcasting. The control circuit 12 detects information indicative of the kind of tuner for receiving television broadcast (indicating which one of analog tuner and digital tuner is used for reception of television signals) or the kind of video signal as represented by a horizontal frequency of input video signal and controls the pass band of the filter circuit 20 by using the detected information. For example, the control circuit 12 controls the pass band in such a way that the pass band of filter circuit 20 is broaden or raised during reception of digital broadcasting as compared to the time that NTSC signals are received. Through this, the pass band of the filter circuit can be optimized in accordance with an input video signal. Therefore, the present embodiment permits contour correction meeting kinds of video signals.

Further, according to the present embodiment, in addition to the control of the filter circuit 20, the coring circuit 19 is also controlled. As shown in FIG. 4B, when the control quantity "small" is selected from the control table, control for intensifying the effect of NR (noise reduction) or turn-on of NR operation is carried out concurrently. In the present embodiment, the control of NR is executed by controlling the coring circuit 19. More particularly, when the control quantity "small" is selected in the control table shown in FIG. 4A, the control circuit 12 delivers a control signal to the coring circuit 19 to control it in such a way that the noise suppressing or eliminating function the coring circuit 19 has can be promoted. For example, the coring circuit 19 is so controlled as to increase the value of NCOR (−NCOR) shown in FIG. 12A for the purpose of broadening the dead zone. In case the coring quantity of coring circuit 19 is 0 (CORING=0), that coring quantity is changed to a predetermined value (>0), thus starting a noise suppression or elimination operation. Through this, when for example a picture is determined as having a great deal of noise components from a histogram of contour components, the noise components can be suppressed or removed properly. Accordingly, in the present embodiment, proper noise suppression conforming to the histogram of contour components can be accomplished. When combined with the first embodiment, the second embodiment can suppress noise components while suppressing amplification of the noise components in a picture having a great deal of noise components (for example, in the case that the combination pattern No. 11 is selected).

(3) Embodiment 3

Next, a third embodiment of the invention will be described with reference to FIG. 7. The third embodiment differs from the first embodiment shown in FIG. 1 in that two systems of the filter circuit and coring circuit in combination are provided, of which one is for detecting a histogram of contour components and the other is for controlling the levels and adding them to a video signal. Components functioning identically to those in FIGS. 1 and 6 are designated by the same reference numerals and will not be described.

Figure 7:
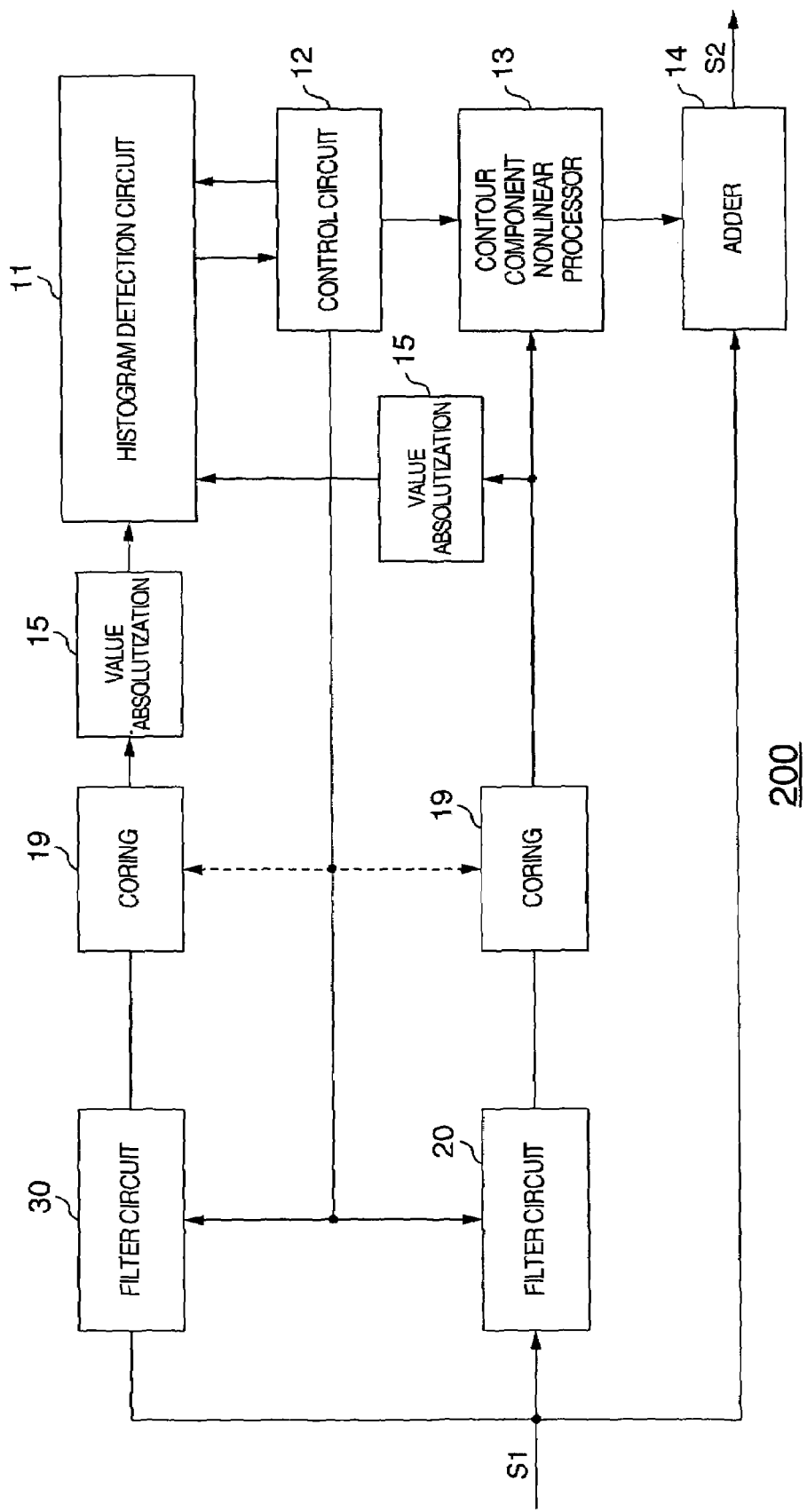
FIG. 7 is a block diagram of a signal correction circuit according to a third embodiment of the invention.

In FIG. 7, a first filter circuit 20 is a BPF (band-pass filter) for extracting contour components from an input video signal and the thus extracted contour components are controlled in amplitude by means of the contour component nonlinear processor 13 and added to an original video signal S1 by means of the adder 14. On the other hand, a second filter circuit 30 is a BPF for similarly extracting the contour components from the input video signal but the contour components extracted herein are supplied to the histogram detection circuit 11 via the coring circuit 19 and value absolutizing circuit 15. Pass bands of the first and second filter circuits 20 and 30 can be controlled individually by means of the control circuit 12. The first and second filter circuits 20 and 30 are connected with the coring circuits 19, respectively, and a noise suppressing process is carried out in each system. Like the first embodiment, the control circuit 12 responds to the results from the histogram detection circuit 11 to control the contour emphasis quantities for the contour component nonlinear processor 13 and besides the filter coefficients of the first and second filter circuits 20 and 30 so as to control their pass bands. Further, the control circuit 12 controls the two coring circuits 19 in the manner described in connection with the second embodiment to perform a noise suppression and elimination process in compliance with a histogram of the contour components.

In the present embodiment, by virtue of the provision of the first filter circuit 20 for contour correction and the second filter circuit 30 for histogram detection, the frequency band of video signal for histogram detection can be separated from that for contour correction. For example, the pass band of the second filter circuit 30 is set to be broader than that of the first filter circuit 20. The control circuit 12 decides, from the results of detection of histogram in the histogram detection circuit 11, which frequency components are contained in a picture by a great deal and controls the pass band of the first filter circuit 20 to a more effective pass band. According to the present embodiment, the pass band of the second filter circuit 30 is broaden and consequently, features of the overall screen can be grasped more accurately. Further, thanks to the provision of the first filter circuit 20 for contour correction, only contour components of frequency components desired to be subjected to contour correction can be controlled in their amplitudes in connection with a signal of the frequency band extracted by means of the second filter circuit 30. Also, in the present embodiment, the control circuit 12 can change the pass band of the first filter circuit 20 so that only a band desired to be subjected to contour correction may be passed. In addition, the control circuit 12 can change the pass band of the second filter circuit 30 so that the accuracy of detection of a histogram of contour components may be changed. For these reasons, according to the present embodiment, contour correction more suited for a picture can be assured.

To add, as shown in FIG. 7, the signal extracted by the first filter circuit 20 may be supplied to the histogram detection filter circuit 11 via value absolutizing circuit 15. In other words, the first filter circuit 20 may be used for not only contour correction but also histogram detection. In this case, histograms can be detected for contour components of different frequency bands and hence histograms of different kinds of contour components can be grasped. Accordingly, through this, contour components of different frequency components (or different frequency bands) can be subjected to proper contour correction modes, respectively.

(4) Embodiment 4

Figure 8:
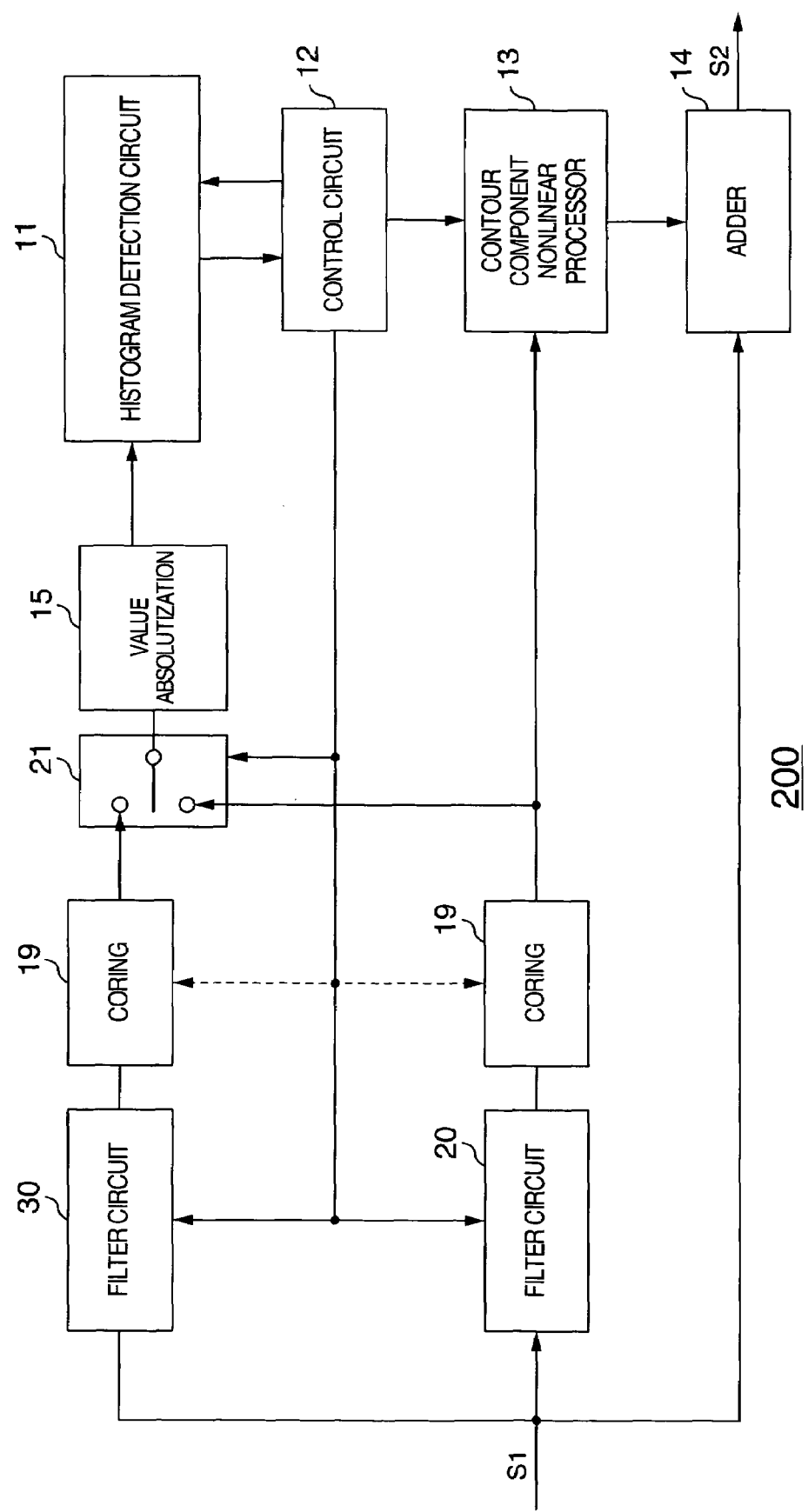
FIG. 8 is a block diagram of a signal correction circuit according to a fourth embodiment of the invention.

Next, a fourth embodiment of the invention will be described with reference to FIG. 8. The fourth embodiment differs from the third embodiment shown in FIG. 7 in that a switch circuit 21 is added which switches over outputs of the two coring circuits 19 to deliver an output to the histogram detection circuit 11.

The histogram detection circuit is fed with the output of either first filter circuit 20 or second filter circuit 30 by the action of the switch circuit 21. The switch circuit may be constructed such that it can be transferred controllably by a control signal from the control circuit 12. Through this, any of contour components of different frequency components can be selected and subjected to the contour correction. Which frequency component or frequency bands are to be selected may be predetermined or alternatively may be switched over properly by means of the control circuit 12 in accordance with conditions of a picture.

(5) Embodiment 5

Figure 9:
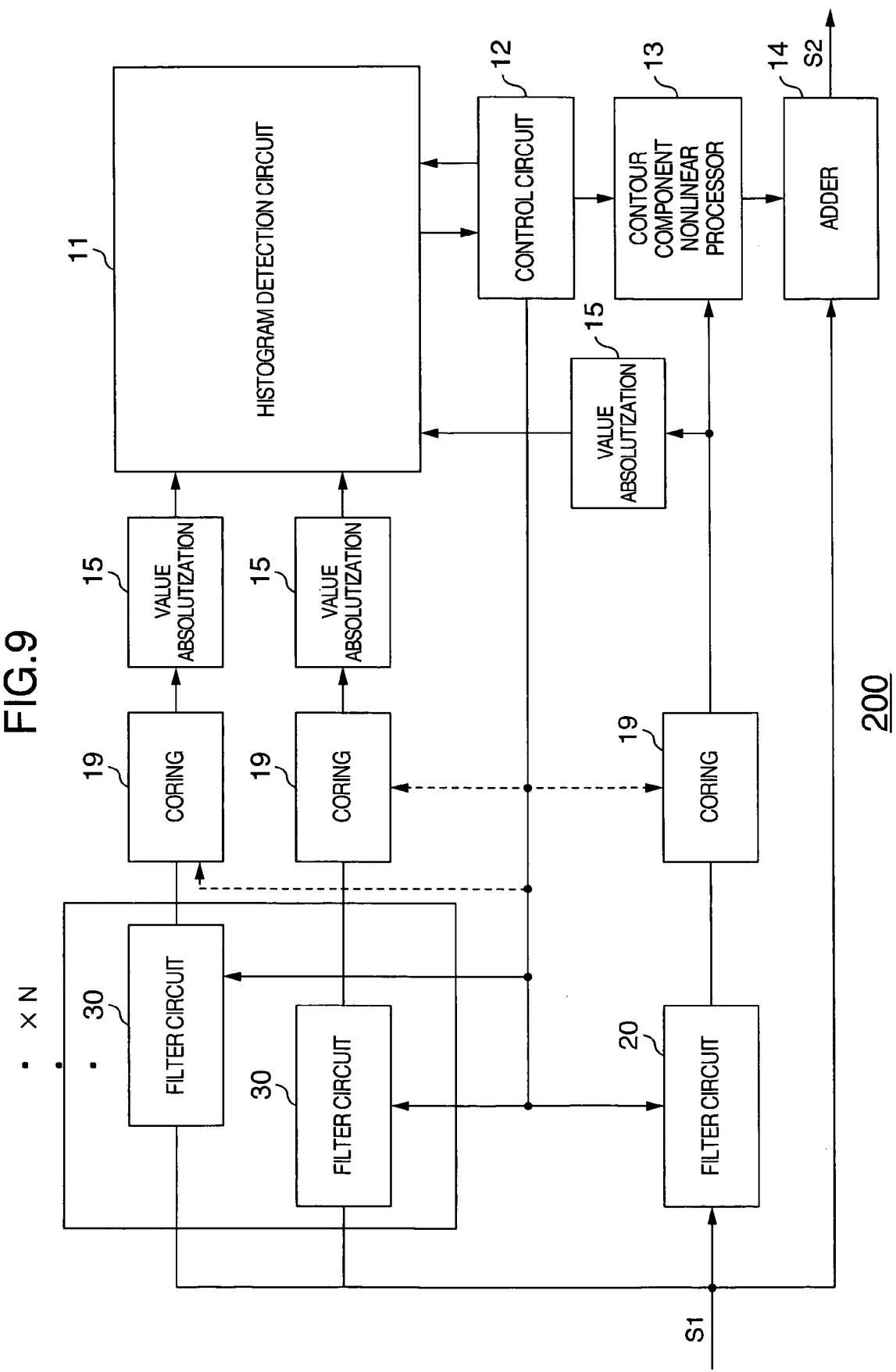
FIG. 9 is a block diagram of a signal correction circuit according to a fifth embodiment of the invention.

Next, a fifth embodiment of the invention will be described with reference to FIG. 9. In the fifth embodiment, there are provided plural systems of the combination of the second filter circuit 30, coring circuit 19 and value absolutizing circuit 15 which is provided in the third embodiment shown in FIG. 7. In other words, in the fifth embodiment, a plurality of second filter circuits for histogram detection having mutually different pass bands are used to make it possible to extract contour components of a greater deal of frequency components.

Further, the pass band of each of the first filter circuits 30 can be controlled by the control circuit 12 and this control is effected in accordance with the results of detection by the histogram detection circuit 11. Like the third and fourth embodiments, each of the coring circuits 19 is so constructed as to be also controlled by the control circuit 12 in accordance with the results of detection by the histogram detection circuit 11. One of the first filter circuits has a pass band suitable for extraction of contour components of a picture mainly consisting of, for example, characters and graphic information and the other has a pass band suitable for extraction of contour components of a picture mainly consisting of, for example, natural scenes. This can ensure that contour components can be extracted properly in compliance with pictures having different display contents and the contour components can be corrected properly. In case an analog broadcast and a digital broadcast are displayed simultaneously on the display unit 300 (so-called two-picture display), one of the first filter circuits has a pass band suitable for extraction of contour components in a picture in the analog broadcast and the other has a pass band suitable for extraction of contour components in a picture in the digital broadcast. In this manner, the contour components can be extracted and corrected properly in accordance with kinds of video signals.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A video display apparatus comprising:
 a signal correction circuit for correcting an input video signal; and
 a display unit for displaying a picture on the basis of the video signal corrected by said signal correction circuit;
 wherein said signal correction circuit corrects the video signal by controlling levels of contour components contained in said input video signal on the basis of frequencies of occurrence of said contour components ranked in individual plural predetermined level ranges;
 wherein said signal correction circuit includes:
 a filter circuit for extracting said contour components from said input video signal;
 a level change circuit for changing levels of the contour components extracted by said filter circuit;
 an adder for adding the contour components delivered out of said level change circuit and said input video signal;
 a detection circuit for detecting frequencies of occurrence of said contour components extracted from said filter circuit over a predetermined period; and
 a control circuit for controlling said level change circuit in accordance with the results of detection by said detection circuit.

2. A video display apparatus according to claim 1, wherein said predetermined period corresponds to one field or one frame period of said video signal.

3. A video display apparatus according to claim 1, wherein said detection circuit detects the occurrence frequencies by cumulating the number of pixels associated with contour components ranked in each of said plurality of predetermined level ranges over one field or one frame period of said video signal.

4. A video display apparatus according to claim 1, wherein said control circuit includes a control table storing in advance the correspondence relation between said occurrence frequencies and control quantities for said level change circuit and reads a control quantity corresponding to an occurrence frequency detected by said detection circuit from said control table to control said level change circuit on the basis of said read-out control quantity.

5. A video display apparatus comprising:
 a signal correction circuit for applying contour correction to an input video signal; and
 a display unit for displaying a picture on the basis of a video signal from said signal correction circuit;
 wherein said signal correction circuit executes the contour correction by using a histogram of contour components contained in said input video signal; and
 wherein said signal correction circuit includes a detection circuit for detecting said histogram by cumulating the number of pixels associated with contour components ranked in each of a plurality of predetermined level ranges over one field or one frame period of said input video signal.

6. A video display apparatus according to claim 5, wherein said signal correction circuit further includes a control circuit for controlling a correction quantity for said contour correction on the basis of the histogram detected by said detection circuit.

7. A video display apparatus according to claim 6, wherein said signal correction circuit further includes:
 a filter circuit for extracting said contour components from said input video signal;
 a contour component nonlinear processor for changing amplitudes of the contour components extracted by said filter circuit; and
 an adder circuit for adding outputs of said contour component nonlinear processor to said input video signal to perform contour correction, and wherein
 said control circuit controls correction quantities of said contour correction by controlling contour emphasis quantities for said contour component nonlinear processor.

8. A video display apparatus comprising:
 a filter circuit for extracting predetermined frequency components from an input video signal;
 a level change circuit for changing levels of said predetermined frequency components extracted by said filter circuit;
 an adder circuit for adding outputs of said level change circuit to the input video signal;
 a display unit for displaying a picture on the basis of an output signal from said adder circuit;
 a histogram detection circuit for detecting a histogram in relation to levels of the predetermined frequency components extracted by said filter circuit; and
 a control circuit for controlling said level change circuit in accordance with the results of detection by said histogram detection circuit.

9. A video display apparatus according to claim 8, wherein said level change circuit is a contour component nonlinear processor for changing amplitudes of said predetermined frequency components and said control circuit controls contour emphasis quantities for said contour component nonlinear processor.

10. A video display apparatus according to claim 8, wherein said control circuit controllably changes the pass band of said filter circuit in accordance with kinds of input video signals.

11. A video display apparatus comprising:
a first filter circuit for extracting first frequency components from an input video signal;
a level change circuit for changing levels of the first frequency components extracted by said first filter circuit;
an adder circuit for adding outputs of said level change circuit to the input video signal;
a display unit for displaying a picture on the basis of an output signal from said adder circuit;
a second filter circuit for extracting second frequency components from said input video signal;
a histogram detection circuit for detecting a histogram in relation to levels of the second frequency components extracted by said second filter circuit; and
a control circuit for controlling said level change circuit and the pass bands of said first and second filter circuits in accordance with the results of detection by said histogram detection circuit.

12. A video display apparatus according to claim 11, wherein the pass band of said second filter is broader than that of said first filter.

* * * * *